US006999169B2

(12) United States Patent
Sanpei et al.

(10) Patent No.: US 6,999,169 B2
(45) Date of Patent: Feb. 14, 2006

(54) SPECTROMETER (75) Inventors: Yoshihiro Sanpei, Musashino (JP);
Makoto Komiyama, Musashino (JP);
Kenji Ogino, Musashino (JP);
Yasuyuki Suzuki, Musashino (JP);
Raiju Okada, Musashino (JP); Shuuhei Okada, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 312 days.

(21) Appl. No.: 10/327,872

(22) Filed: Dec. 26, 2002

(65) Prior Publication Data

US 2003/0128359 A1      Jul. 10, 2003

(30) Foreign Application Priority Data

Jan. 10, 2002    (JP)    ............................. 2002-002991

(51) Int. Cl.
*G01J 3/28*    (2006.01)
(52) U.S. Cl. ......................................... 356/328
(58) Field of Classification Search ............... 356/308, 356/328, 334
See application file for complete search history.

(56) References Cited

U.S. PATENT DOCUMENTS

| | | | | |
|---|---|---|---|---|
| 2,742,605 | A | * | 4/1956 | McMillan, Jr. ............... 346/49 |
| 3,565,567 | A | * | 2/1971 | Rains .......................... 356/308 |
| 4,930,892 | A | * | 6/1990 | Hadbawnik et al. ........ 356/328 |
| 5,646,401 | A | * | 7/1997 | Udd ....................... 250/227.18 |
| 5,815,277 | A | * | 9/1998 | Zare et al. ................... 356/437 |
| 5,933,235 | A | | 8/1999 | Sampei et al. |
| 5,956,355 | A | * | 9/1999 | Swanson et al. ............ 356/479 |
| 6,201,565 | B1 | * | 3/2001 | Balogh ........................ 356/457 |
| 6,429,968 | B1 | * | 8/2002 | Carver ........................ 356/326 |
| 6,687,001 | B2 | * | 2/2004 | Iwama ........................ 356/328 |

FOREIGN PATENT DOCUMENTS

| | | |
|---|---|---|
| JP | 61-270736 | 12/1986 |
| JP | 01-197617 | 8/1989 |
| JP | 03-102229 | 4/1991 |
| JP | 05-134275 | 5/1993 |
| JP | 11-194280 | 7/1999 |

* cited by examiner

*Primary Examiner*—Zandra V. Smith
*Assistant Examiner*—Kara Geisel
(74) *Attorney, Agent, or Firm*—Westerman, Hattori, Daniels & Adrian, LLP

(57) ABSTRACT

The present invention is intended to realize a spectrometer which improves the wavelength resolution without being affected by the pitch of the photodiode array.

The present invention is characterized by a spectrometer which comprises a wavelength dispersion device spectrally dividing the measured light beam and a photodiode array composed of a plurality of photodiodes that detect the spectrally divided light beams by the wavelength dispersion device and output photocurrents, and performs measurement using the outputs of the photodiode array; providing a deflecting means that deflects the measured light beams and changes the position where the measured light beams are detected by the above photodiode array, and measuring the characteristics of the measured light beam from the measured results for different deflection amounts.

5 Claims, 9 Drawing Sheets

The data of group 1    The data of group 2

Sorting the data of group 1,2
in order of the wavelength

SPECTROMETER

BACKGROUND OF THE INVENTION

1. Field of the Invention

The present invention relates to a spectrometer in which the wavelength resolution is improved without being affected by the pitch of a photodiode array.

2. Description of the Prior Art

Wavelength Division Multiplexing (WDM) communication is one type of optical communication systems which transmit optical signals by using optical fibers. This WDM communication is a communication system which transmits multiple optical signals of different wavelengths using a single optical fiber. Multiple optical signals of different wavelengths are also called WDM signals. In many cases, each optical signal in WDM signals is counted, for example, in ascending order of wavelength (that is, starting at the shortest wavelength) as channel 1, channel 2, etc.

The spectrometer is a measuring equipment that obtains the wavelength spectrum of the light being measured (hereafter called 'measured light beam') using a wavelength dispersion device, determines the optical power existing in an arbitrary wavelength band, and measures the characteristics of the measured light beam using this determined optical power. This spectrometer is used for measuring WDM signals very frequently, and obtains the wavelength spectrum of input WDM signals and determines optical signal levels and wavelengths and the like for each channel using the optical power determined.

Figure 1:
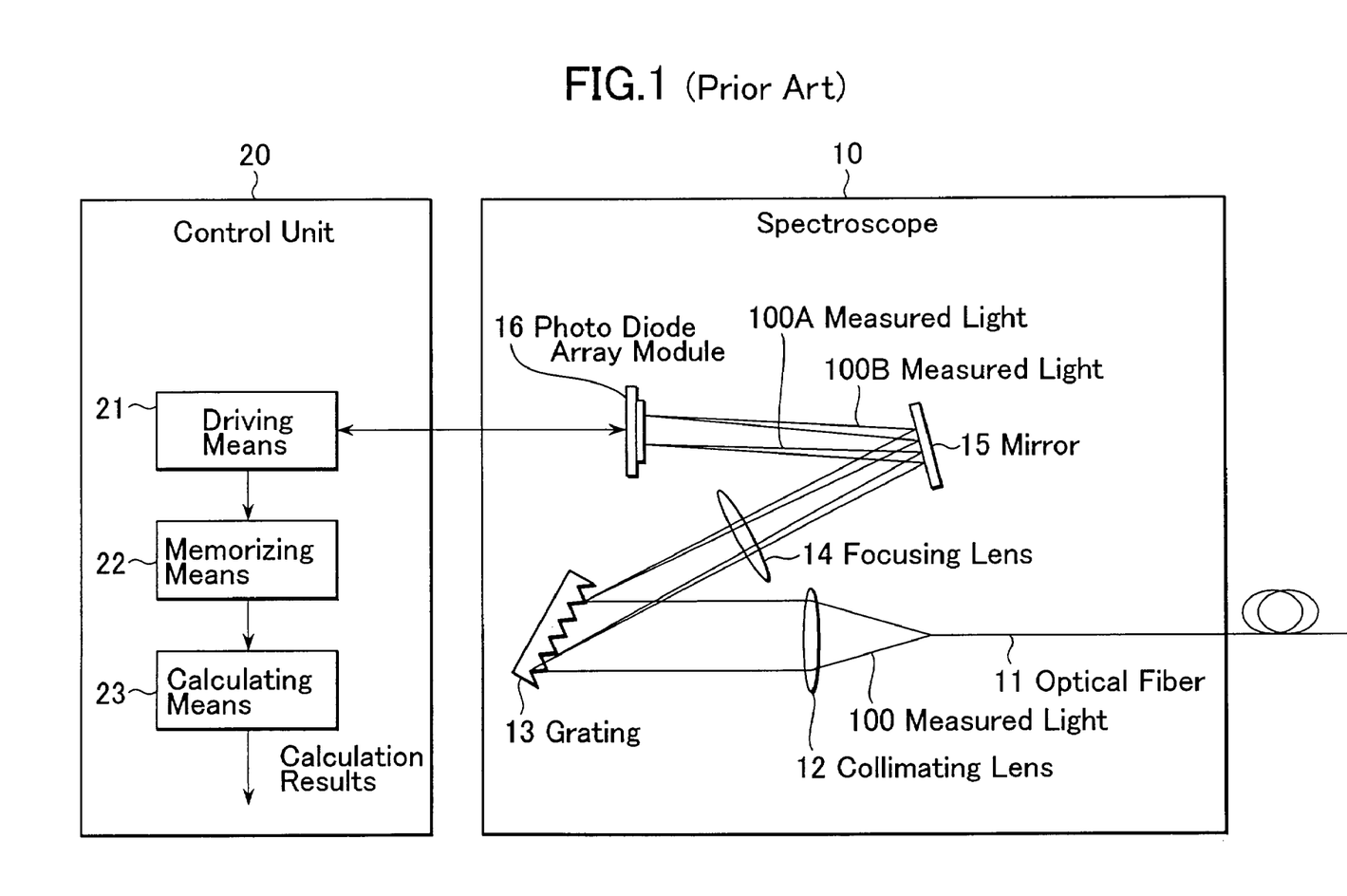
FIG. 1 is a configuration drawing indicating an embodiment of the conventional spectrometer.

FIG. 1 is a configuration drawing indicating an embodiment of spectrometers that measure such WDM signals. In FIG. 1, spectroscope 10 is called a polychromator system into which WDM signals, the measured light beams, are input and which sends out the output corresponding to an optical power existing in an arbitrary wavelength band as a measured signal.

Spectroscope 10 is composed of optical fiber 11, collimating lens 12, grating 13 that is a wavelength dispersion device, focusing lens 14, mirror 15, and photodiode array module 16 (hereafter abbreviated as "PDM").

Optical fiber 11 is a transmission line for making the measured light beam incident to spectroscope 10. Collimating lens 12 is installed counter to the optical output window of optical fiber 11 and emits measured light beam 100 output from optical fiber 11 after collimating it.

Grating 13 is installed oblique to collimating lens 12 to diffract the emitted light beam from collimating lens 12 by a desired angle. Then, grating 13 emits measured light beam 100 into a spectrum deflecting the light beam to different angles for every wavelength. Focusing lens 14 is provided on the optical path of emitted light from grating 13 and focuses the emitted light. Mirror 15 is installed to reflect the emitted light from focusing lens 14 in the desired direction.

PDM 16 is placed in the position at which measured light beam 100 reflected from mirror 15 focuses. On PDM 16, a PD array is formed, in which a plurality of strip-type or spot-type photodiodes (hereafter abbreviated as "PD") is arranged. Each of these PDs generates a current (photocurrent) corresponding to the optical power of incident measured light beam 100 and outputs these photocurrents as measured signals of spectroscope 10.

In addition, a wavelength is assigned to each PD in advance. The assignment of wavelength corresponds to each position at which measured light beam 100 is deflected for each wavelength by grating 13 and focused on the PD array.

Control unit 20 comprises driving means 21, memorizing means 22, and calculating means 23. Driving means 21 changes over connections to each PD of PDM 16 in turn, reads measured signals from each PD in turn, for example, in ascending order of wavelength from the shortest one, and outputs each measured signal after converting them to the desired signals. Memorizing means 22 stores signals output from driving means 21 in turn. Calculating means 23 reads signals stored in memorizing means 22, determines the optical signal levels, wavelengths, or the like of measured light beam 100, and outputs the calculated results.

Operation of the spectrometer shown in FIG. 1 will now be described. Assume that different wavelengths of wavelength A and wavelength B are multiplexed in measured light beam 100. Measured light beam 100 emitted from optical fiber 11 is collimated with collimating lens 12. Measured light beam 100 transmitted through collimating lens 12 is incident to grating 13, and is spectrally divided into measured light beams 100A and 100B for each wavelength of $\lambda A$ and $\lambda B$ with this grating 13. Although measured light beams 100A and 100B spectrally divided with grating 13 are focused on the PD array of PDM 16 by focusing lens 14 and mirror 15, the positions of focusing the optical spot are shifted corresponding to wavelengths $\lambda A$ and $\lambda B$ of measured light beams 100A and 100B. Photocurrents are output from each PD respectively. As described above, spectroscope 10 does not contain mechanical moving parts and can operate stably for a long time.

Driving means 21 changes over connections to each PD of PDM 16 in turn, reads photocurrents generated in each PD in turn starting at the shortest wavelength, and converts these read photocurrents to voltages. In addition, since the signals converted to voltages are analog signals, driving means 21 converts these analog signals to digital signals and stores them in memorizing means 22 in the order of reading from each PD. Calculating means 23 determines the optical signal levels and peak wavelengths of each channel using digital signals stored in memorizing means 22 and wavelengths assigned to each PD, and outputs these calculation results. The output unit not shown displays the calculation results output from calculating means 23, for example, on the screen of the display unit or outputs them to external equipment not shown.

Figure 2:
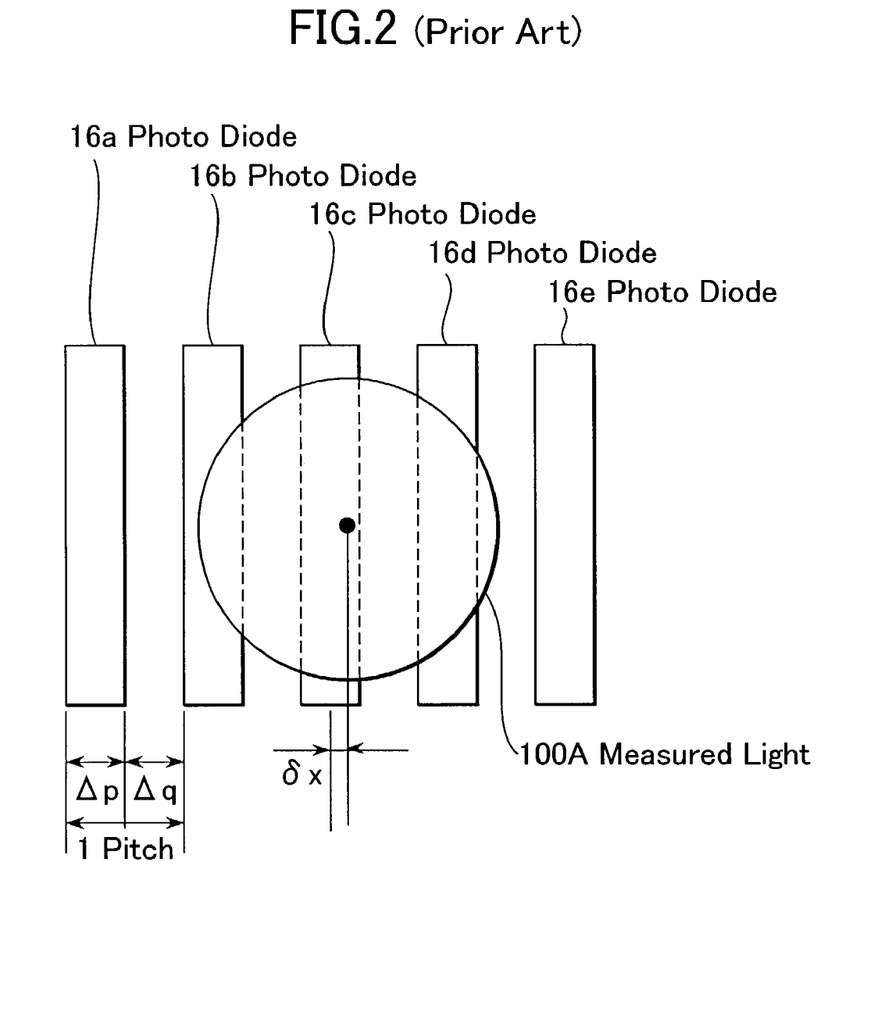
FIG. 2 is a schematic drawing showing part of a photodiode array.

Subsequently, the action of calculating means 23 for determining the optical signal levels and peak wavelengths of each channel will now be described in detail. FIG. 2 schematically shows that part of the PD array is irradiated with measured light beam 100A. In FIG. 2, PD16a to PD16e are arranged in the direction in which measured light beam 100 is spectrally divided for wavelengths $\lambda A$ and $\lambda B$ by grating 13. Wavelengths of $\lambda_a$ to $\lambda_e$ ($\lambda_a < \lambda_b < \ldots < \lambda_e$) are assigned to each PD of 16a to 16e respectively.

In addition, the PD array is not formed such that PD16a to PD16e that generate photocurrents are arranged without gaps in the direction of arrangement, but is formed such that PD16a of width $\Delta p$, a dead zone of width $\Delta q$, PD16b of width $\Delta p$ ... are arranged in this order in the direction of arrangement. Therefore, the width of one pitch is the sum of the width $\Delta p$ of each PD of PD16a to PD16e and the width of dead zone $\Delta q$. Although each of PD16a to PD16e has the width $\Delta p$, the center positions of each PD in the direction of arrangement are generally made to correspond to assigned wavelengths $\lambda_a$ to $\lambda_e$ respectively.

From one side or both sides of each of PD16a to PD16e, photocurrents are output by signal wires not shown.

Figure 3:
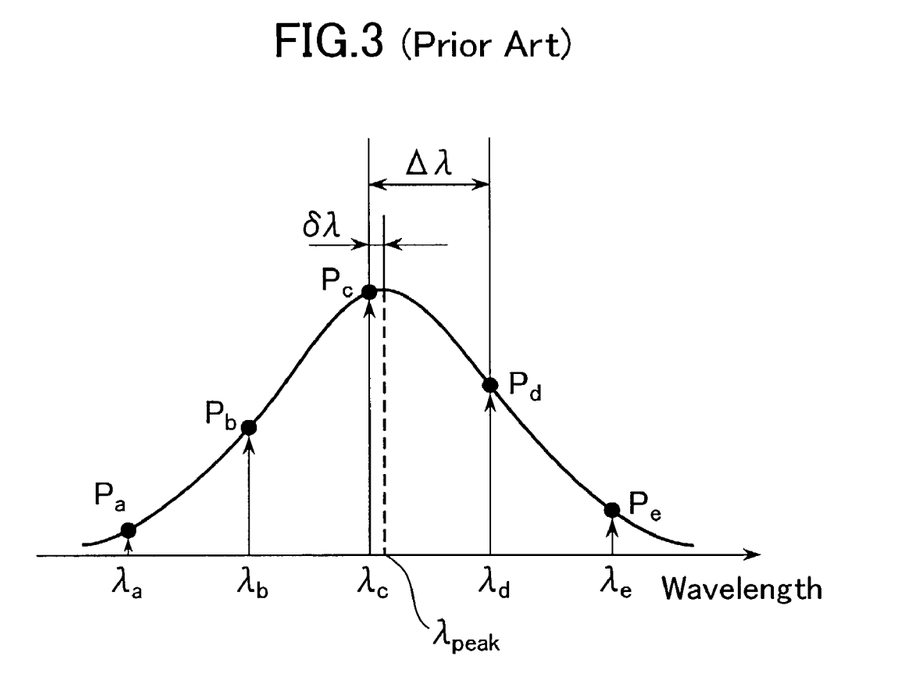
FIG. 3 is a graph showing an output characteristic indicating an example of the relationship between a photodiode array and photodiode outputs.

If measured light beam 100A has a line spectrum such as laser light, the optical spot of measured light beam 100A formed on the PD array takes the shape of an ellipse or circle, whose optical power shows a Gaussian distribution. In this case, it is assumed that the center of measured light beam 100A is in the vicinity of PD16*c*. FIG. 3 indicates the outputs of each of PD16*a* to PD16*e* stored in memorizing means 22. The abscissa shows wavelengths $\lambda_a$ to $\lambda_e$ assigned to each of PD16*a* to PD16*e*, and the ordinate shows the relative outputs of PD16*a* to PD16*e*. The outputs of PD16*a* to PD16*e* are represented by $P_a$ to $P_e$. Since the center of measured light beam 100A exists in the vicinity of PD16*c*, it is apparent that the output $P_c$ from PD16*c* is larger than any of the other outputs $P_a$, $P_b$, $P_d$, and $P_e$. In addition, $\Delta\lambda$ shows a value in wavelength converted from the width of one pitch of the PD array.

The response of spectroscope 10 to a line spectrum input to it is approximated as a Gaussian distribution and the peak wavelength $\lambda_{peak}$ of measured light beam 100A can be expressed by equation (1).

$$\lambda_{peak} = \lambda_0 + \delta\lambda \tag{1}$$

where $\lambda_0$ is the wavelength $\lambda_c$ assigned to PD16*c* whose optical power is closest to the peak optical power and $\delta\lambda$ represents the difference between the peak wavelength $\lambda_{peak}$ and the wavelength $\lambda_c$ assigned to PD16*c* whose optical power is closest to the peak optical power. The value $\delta\lambda$ can also be expressed from equation (2) using the distance $\delta x$ between the center of PD16*c* and the center of the optical spot of measured light beam 100A in FIG. 2, and the ratios of the output of PD16*c* nearest to the center of the optical spot of measured light beam 100A to each output of PD16*b* and PD16*d* both adjacent to PD16*c*.

$$\delta\lambda = \delta x \frac{\Delta\lambda}{(\Delta p + \Delta q)} \tag{2}$$
$$= \frac{\Delta\lambda}{2} \cdot \frac{\ln\left(\frac{P_{+1}}{P_{-1}}\right)}{\ln\left(\frac{P_0 \cdot P_0}{P_{-1} \cdot P_{+1}}\right)}$$

where $P_0$ corresponds to the output $P_c$ of PD16*c* nearest to the peak optical power, and $P_{-1}$ and $P_{+1}$ correspond to $P_b$ and $P_d$ respectively.

The optical signal level $P_{sig}$ of measured light beam 100A can be determined as shown in equation (3) using the integral of the spectrum spread over the PD array, or the sum of output values $P_b$, $P_c$, and $P_d$ from three PDs, that is, PD16*b*, PD16*c*, and PD16*d* near the peak optical power:

$$P_{sig} = \alpha(\delta x) \cdot (P_{-1} + P_0 + P_{+1}) \tag{3}$$

where $\alpha(\delta x)$ is a function taking the distance between the center of the optical spot and the center of PD16*c* as a variable. This is because the value to be added differs depending on the distance between the center of the optical spot and the center of PD16*c*. This is a function determined by the diameter of the optical spot and the width of one pitch of the PD array.

Since operations in which calculating means 23 determines the optical signal level and peak wavelength of measured light beam 100B in the other channel are similar to the above, description of them will be omitted.

The wavelength resolution of spectroscope 10 depends on the size of the optical spot formed on the PD array. To improve the wavelength resolution, it is sufficient to make the optical spot size smaller (to sharpen the response spectrum) and focus it to one pitch of the PD array or less.

FIG. 4 shows the outputs of PD16*a* to PD16*e*, $P_a$ to $P_e$, in the case of, for example, improving the wavelength resolution by taking the optical spot size to about one pitch of PD16*a* to PD16*e*. The wavelength resolution represents the performance that can identify channels if each channel is brought near. In FIG. 4, the same objects as those in FIG. 3 are given the same signs and so description of them is omitted.

Figure 4A:
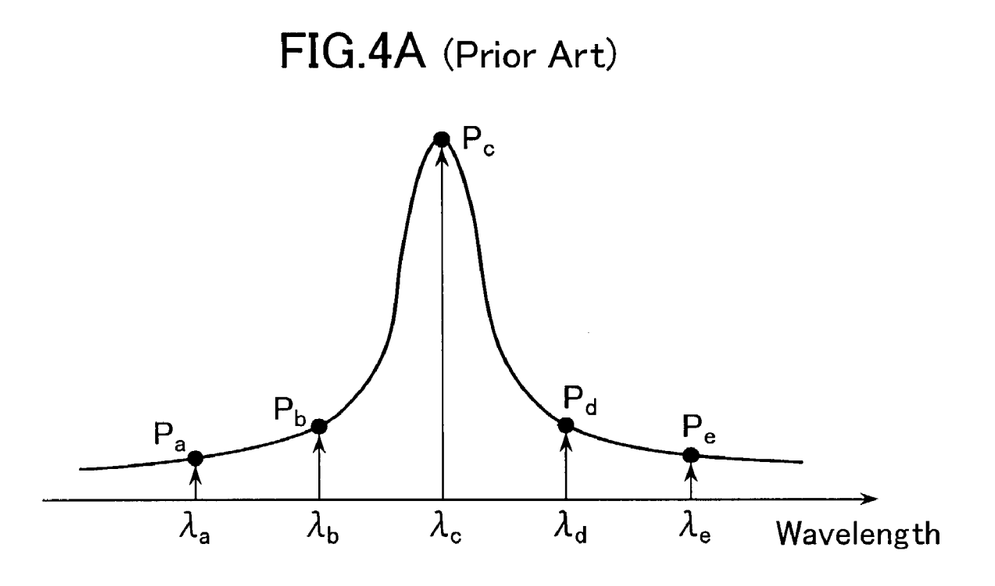
FIG. 4 shows graphs representing output characteristics indicating examples of the relationship between a photodiode array and photodiode outputs in the case where the optical spot of measured light beam 100A is small.

FIG. 4 (*a*) indicates the case where the peak optical power of measured light beam 100A exists close to the center of PD16*c*. In FIG. 4 (*a*), outputs $P_b$ and $P_d$ that can be detected with PD16*b* and PD16*d* both adjacent to PD16*c* which is nearest to the peak become extremely small. For this reason, these are easily subjected to influences of noise and it is hard to determine the optical signal level and the peak wavelength accurately.

Figure 4B:
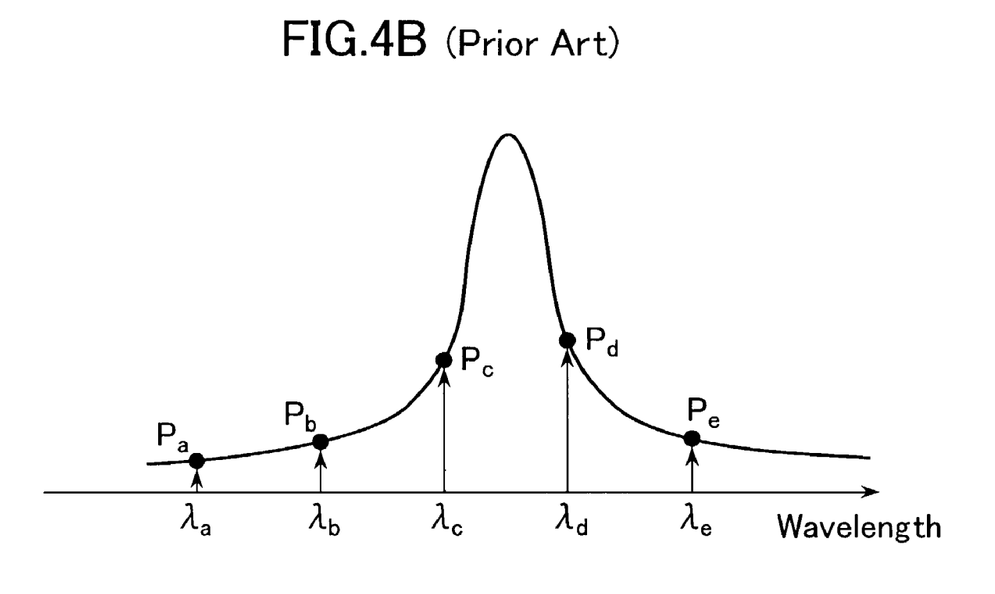

Also, FIG. 4 (*b*) indicates the case where the peak optical power of measured light beam 100A exists at about the mid point between PD16*c* and PD16*d* (dead zone). In FIG. 4 (*b*), since the major part of the optical power is concentrated in the dead zone, PD16*c* and PD16*d*, the output $P_b$ that can be detected with PD16*b* becomes extremely small. For this reason, the output $P_b$ is easily subjected to influences of noise and it is hard to determine the optical signal level and the peak wavelength accurately.

As described above, when the optical spot is made small to improve the wavelength resolution, the outputs of PDs to be used for calculation become small and are easily subjected to influences of noise. Accordingly, it becomes difficult to measure the optical signal level and the peak wavelength accurately. To reduce the influences of noise, it is sufficient to make the pitch of the PD array small. However, the types of generally available PD arrays are limited and it is not easy to change the shape such as changing the pitch of a PD array.

SUMMARY OF THE INVENTION

The purpose of the present invention is to realize a spectrometer in which the wavelength resolution is improved without being affected by the pitch of a photodiode array.

DETAILED DESCRIPTION OF THE PREFERRED EMBODIMENTS

The embodiments of the present invention will now be described below with reference to the drawings.

Figure 5:
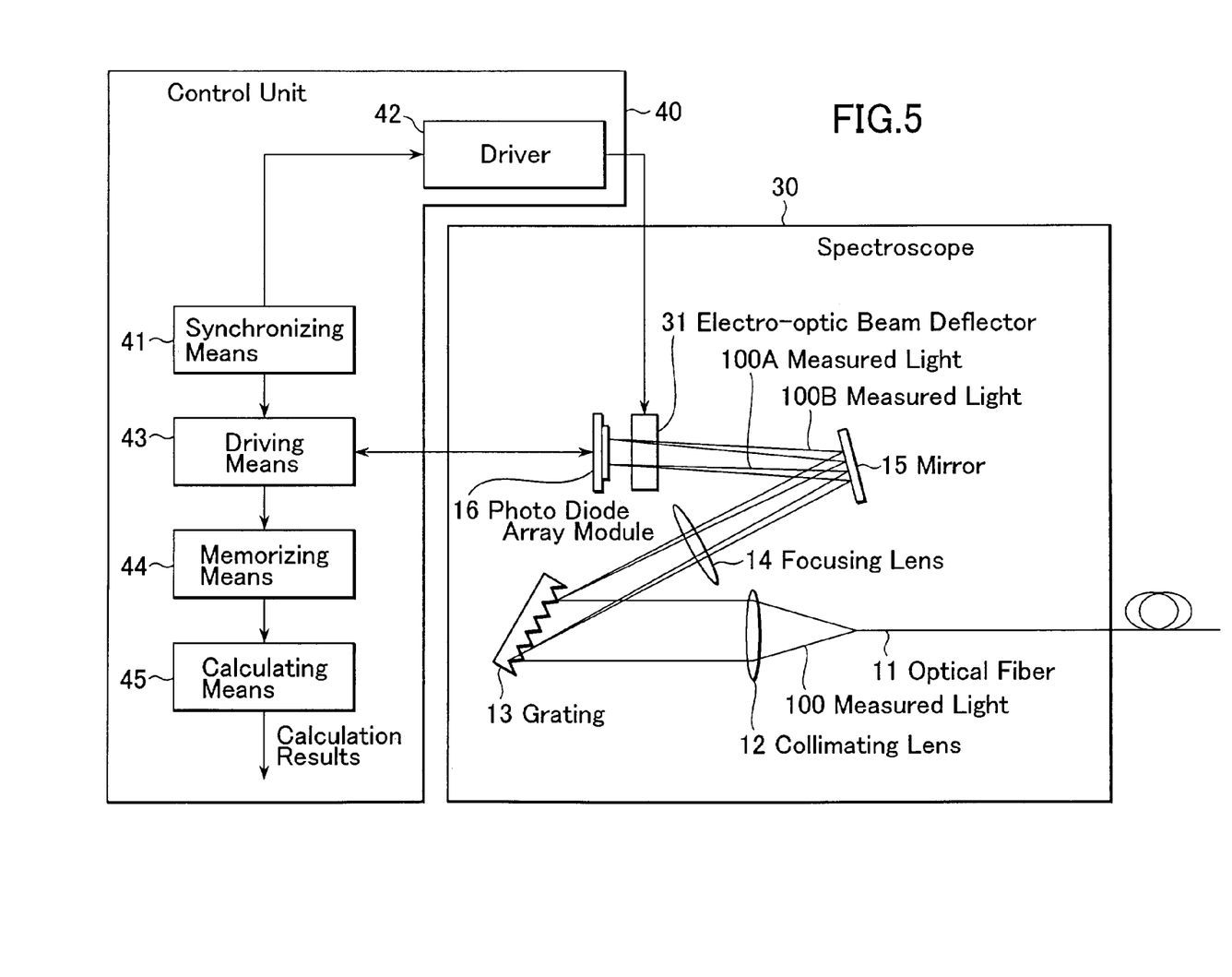
FIG. 5 is a configuration drawing indicating a first embodiment of the present invention.

FIG. 5 is a configuration drawing indicating a first embodiment of the present invention. In FIG. 5, the same objects as those in FIG. 1 are given the same signs and so description of them is omitted. In FIG. 5, spectroscope 30 is provided instead of spectroscope 10 and electro-optic beam deflector 31, which is one type of deflecting means that deflects measured light beams 100A and 100B, is newly installed between mirror 15 and PDM 16.

Electro-optic beam deflector 31 is a light deflector using the effect that the refractive index of a medium varies with an applied DC or applied electric field whose frequency is sufficiently lower than the optical frequency (electro-optic effect) by receiving a current or a voltage from outside. For example, deflection can be performed by changing the emitting direction of a prism by changing its refractive index or forming a linear phase distribution in a cross sectional plane orthogonal to the light wave propagating direction by refractive index changes generated in a medium by the electro-optic effect.

Control unit 40 is provided instead of control unit 20 and is composed of synchronizing means 41, driver 42, driving means 43, memorizing means 44 and calculating means 45. Synchronizing means 41 outputs the synchronizing signals. Driver 42 applies a desired voltage to electro-optic beam deflector 31 according to synchronizing signals of synchronizing means 41. Driving means 43 changes over connections with each PD of PDM 16 in turn according to synchronizing signals of synchronizing means 41, reads the measuring signals of each PD in turn, for example, starting at the shortest wavelength, and outputs the measured signals after converting them to the desired signals. Memorizing means 44 stores the signals output from driving means 43 in turn and can hold the signals output from driving means 43 for an amount of up to several times of output. Calculating means 45 reads the signals stored in memorizing means 44 for an amount of up to several times of output, determines the optical signal level, the wavelengths, and the like of measured light beam 100 based on these read-out signals, and outputs the calculated results.

Operation of the spectrometer shown in FIG. 5 will now be described. Synchronizing means 41 outputs the first time synchronizing signal to driver 42 and driving means 43. Driver 42 deflects measured light beams 100A and 100B reflected by mirror 15 by the desired amount in the arranging direction of the PD array in PDM 16, by applying a voltage $V_a$ to electro-optic beam deflector 31 based on the synchronizing signal. Here, it is assumed that the centers of the optical spots of measured light beams 100A and 100B irradiate the same positions on the PD array of the spectroscope shown in FIG. 1. The deflected measured light beams 100A and 100B focus on the PD array respectively and photocurrents are output from each PD as the measuring signals.

Driving means 43 changes over the connection of each PD of PDM 16 based on the synchronizing signal and reads photocurrents generated in each PD in ascending order of wavelength starting at the shortest wavelength. Driving means 43 further converts these photocurrents to voltages, converts the analog signals converted to voltages to digital signals, and stores them in memorizing means 44. Digital signals stored in memorizing means 44 by the first time synchronizing signal are collected as the group 1 data.

Subsequently, synchronizing means 41 outputs the second time synchronizing signal to driver 42 and driving means 43 again. Driver 42 applies voltage $V_b$ to electro-optic beam deflector 31 based on this synchronizing signal and deflects measured light beams 100A and 100B reflected by mirror 15 by the desired amount in the arranging direction of the PD array. However, measured light beams 100A and 100B are deflected so that they irradiate the position deflected by a ½ pitch toward longer wavelengths from the position on the PD array irradiated with measured light beams 100A and 100B by the first time synchronizing signal. Deflected measured light beams 100A and 100B focus on the PD array respectively and photocurrents are output from each PD as the measured signals.

Driving means 43 changes over the connection of each PD of PDM 16 based on the synchronizing signal and reads the photocurrents generated in each PD in ascending order of wavelength starting at the shortest wavelength. Driving means 43 further converts these photocurrents to voltages, converts the analog signals converted to voltages to digital signals, and stores them in memorizing means 44. In this case, these signals are stored in a region other than that for group 1 data stored in memorizing means 44 based on the first time synchronizing signal. Digital signals stored in memorizing means 44 by the second time synchronizing signal are collected as the group 2 data.

Calculating means 45 reads the group 1 and group 2 data from memorizing means 44 and carries out sorting of the group 1 and group 2 data in the order of the wavelength values. Through this operation, the group 1 and group 2 data become the data for interpolating each other and thus measured signals similar to those in the case of measurement with a ½ pitch on the PD array of PDM 16 are obtained.

Figure 6:
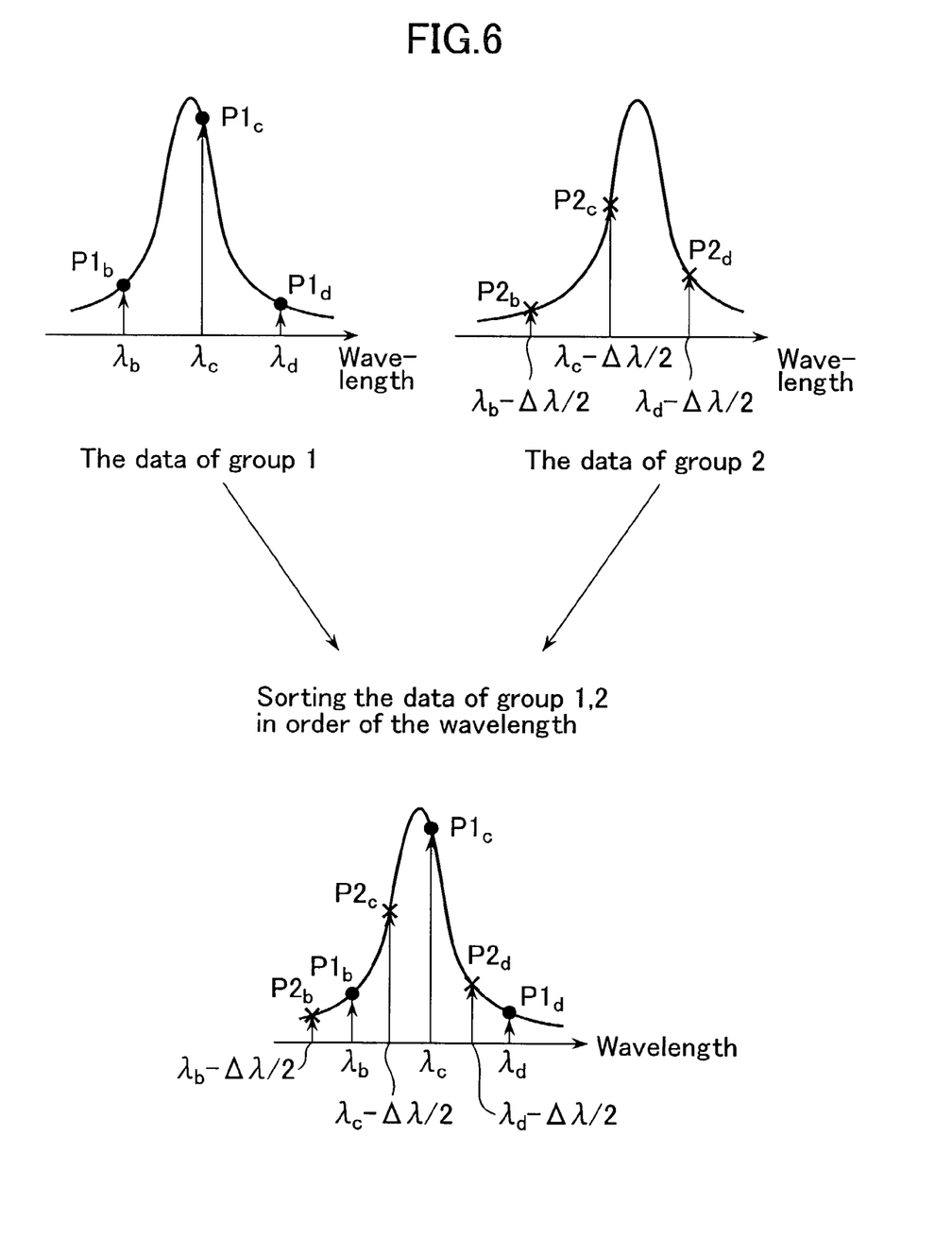
FIG. 6 shows graphs representing output characteristics indicating examples of the relationship between a photodiode array and photodiode outputs, in one of which calculating means 45 in a spectrometer shown in FIG. 5 carries out the sorting of the data of groups 1 and 2 in the order of the wavelength values.

FIG. 6 shows graphs indicating the outputs of each of group 1 and group 2 data and outputs of the interpolated data in the spectrometer shown in FIG. 5. In FIG. 6, the same objects as those in FIG. 3 are given the same signs and so description of them is omitted. However, in FIG. 6, only the data for PD16b to PD16d in the vicinity of the peak are shown. Since, for the group 2 data, the position of measured light beam 100A irradiation is deflected by a ½ pitch toward the longer wavelength, the wavelengths assigned to each of PD16b to PD16d are shifted toward the shorter wavelength by a ½ pitch respectively. In FIG. 6, for the group 1 data, the outputs corresponding to PD16b to PD16d are given the signs P1$_b$ to P1$_d$ respectively and represented with symbols •; and for the group 2 data, the outputs corresponding to PD16b to PD16d are given the signs P2$_b$ to P2$_d$ respectively and represented with symbols x.

Calculating means 45 determines the optical signal level and peak wavelength of measured light beam 100A using equations (1) to (3) from the values of wavelengths in the vicinity of peak $\lambda_c - \Delta\lambda/2$, $\lambda_c$, and $\lambda_d - \Delta\lambda/2$ and the outputs corresponding to these wavelengths P2$_c$, P1$_c$ and P2$_d$ based on the interpolated data. However, the first term of the second line of equation (2) becomes $\Delta\lambda/4$ because measured light beam 100A is deflected by a ½ pitch and the pitch of the PD array is reduced to ½.

Since the operations for determining the optical signal level and the peak wavelength of measured light beam 100B are identical to the above, description of them is omitted. In addition, since other operations in the spectrometer shown in FIG. 5 are similar to those in the spectrometer shown in FIG. 1, description of them is also omitted.

As described above, the measurement of measured light beams 100A and 100B is carried out by deflecting measured light beams 100A and 100B in the arranging direction of the PD array on PDM 16 with electro-optic beam deflector 31, performing a series of operations in which measured signals are acquired by driving means 43 two or more times, and sorting these signals in order of wavelength values. This enables measured signals obtained by sorting to be acquired equivalent to the measurement with a pitch smaller than one pitch, and thus measurement can be performed even if the optical spot size of measured light beams 100A and 100B is made smaller because the data whose detecting outputs are small and which are easily subjected to influences of noise are not used. Consequently, the optical signal level and the peak wavelength can be measured with improved wavelength resolution.

Further, since electro-optic beam deflector 31 employs the electro-optic effect without having mechanically moving parts, spectroscope 30 can be operated stably for a long time.

Figure 7:
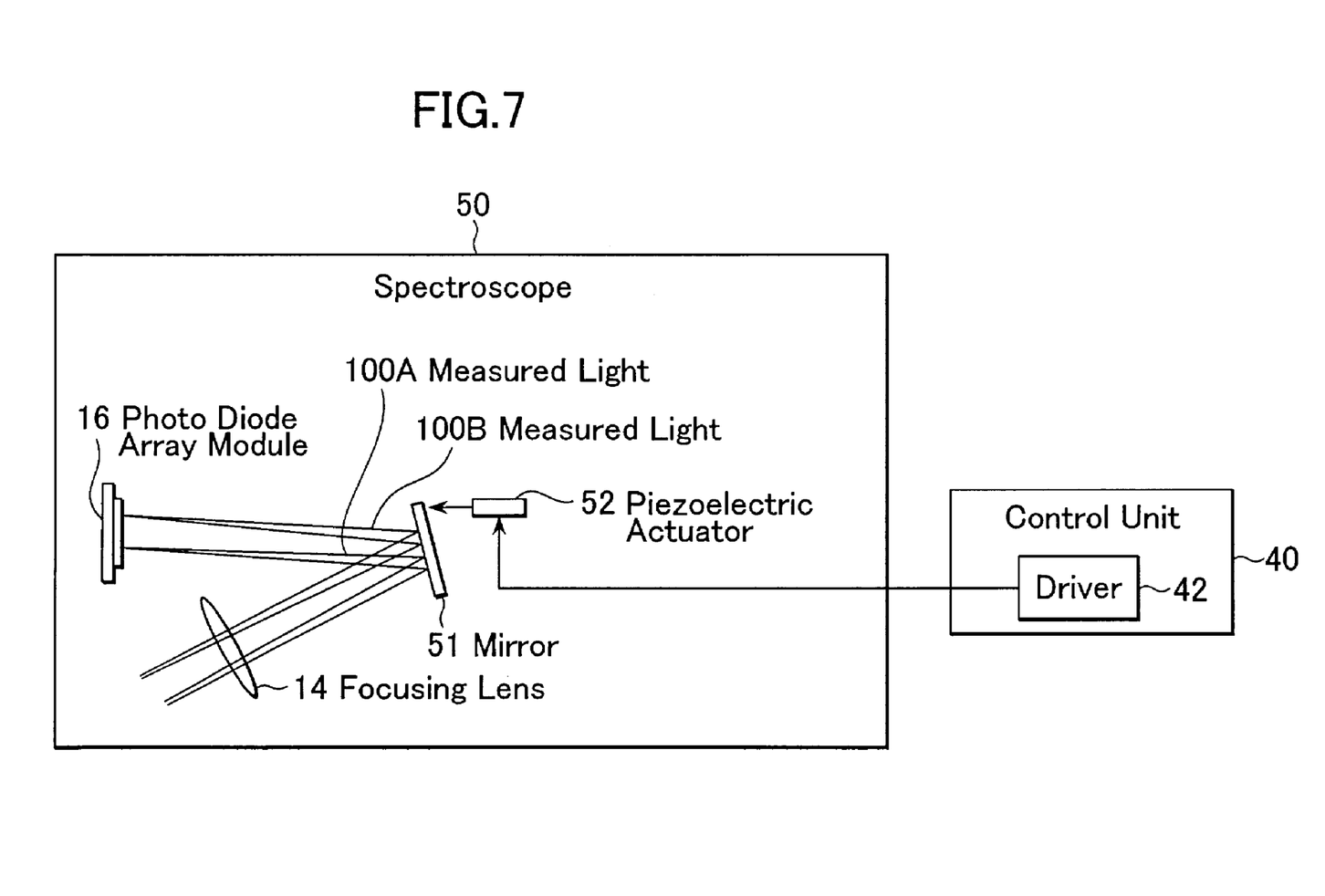
FIG. 7 is a configuration drawing indicating a second embodiment of the present invention.

FIG. 7 is a configuration drawing indicating a second embodiment of the present invention. In FIG. 7, the same objects as those in FIG. 5 are given the same signs and so description of them and indication in the drawing are both omitted. In FIG. 7, spectroscope 50 is provided instead of spectroscope 30 and mirror 51 instead of mirror 15. In addition, piezoelectric actuator 52 is mounted instead of a deflecting means, electro-optic beam deflector 31, so that the actuator mechanically shifts the position of mirror 51 to compose a deflecting means using piezoelectric actuator 52 and mirror 51. A voltage is applied to piezoelectric actuator 52 from driver 42. Piezoelectric actuator 52 generates a mechanical stress, such as expansion or contraction, if a voltage is applied.

Operations of the spectrometer shown in FIG. 7 will now be described. Driver 42 applies voltage Vc to piezoelectric actuator 52 based on the first time synchronizing signal, shifts piezoelectric actuator 52 by the desired amount, and deflects measured light beams 100A and 100B reflected by mirror 51 in the arranging direction of the PD array on PDM 16. Here, it is assumed that the center of the optical spot of measured light beams 100A and 100B irradiates the same position as that on the PD array of the spectrometer shown in FIG. 5. Further, driver 42 applies voltage Vd to piezoelectric actuator 52 based on the second time synchronizing signal, shifts piezoelectric actuator 52 by the desired amount, and deflects measured light beams 100A and 100B reflected by mirror 51 in the arranging direction of the PD array. However, measured light beams 100A and 100B are deflected so that their irradiating position on the PD array is shifted by a ½ pitch towards the longer wavelength from the position at which measured light beams 100A and 100B irradiate on the PD array based on the first time synchronizing signal.

Here, since operations other than applying voltages Vc and Vd to piezoelectric actuator 52 based on the synchronizing signals and deflecting reflected light from mirror 51 by the desired amount are the same as those in the spectrometer shown in FIG. 5, description of them is omitted.

As described above, measured light beams 100A and 100B are measured by deflecting measured light beams 100A and 100B in the arranging direction of the PD array on PDM 16 using mirror 51 and piezoelectric actuator 52, performing a series of operations, in which driving means 43 acquires measuring signals two or more times, and sorting these signals in order of wavelength values. This enables measured signals obtained by sorting to be acquired similar to the measurement with smaller pitch than one pitch, and thus measurement can be performed even if the optical spot size of measured light beams 100A and 100B is made smaller because the data whose detecting outputs are small and which are easily subjected to influences of noise are not used. Consequently, the optical signal level and the peak wavelength can be measured with improved wavelength resolution.

Figure 8:
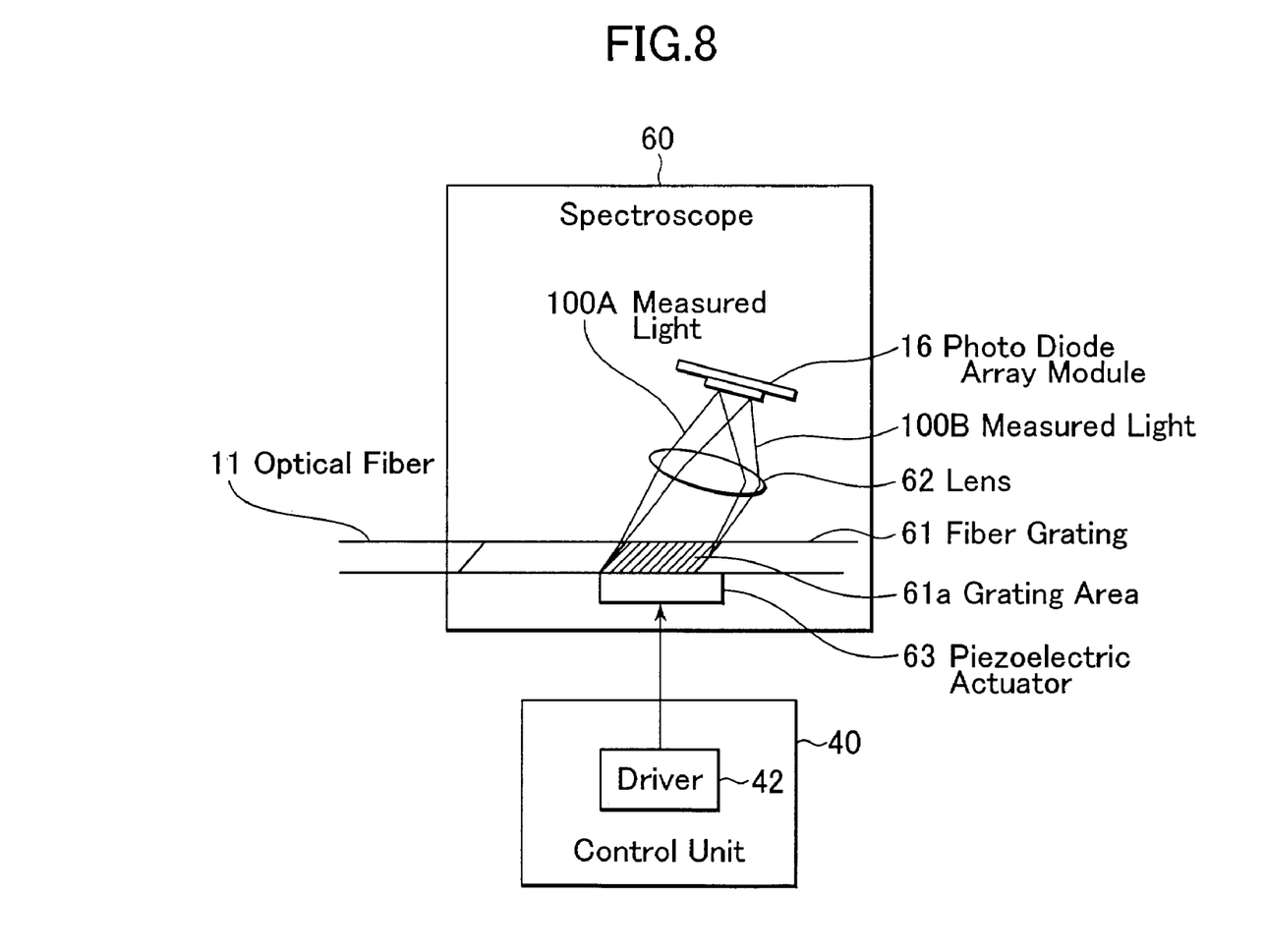
FIG. 8 is a configuration drawing indicating a third embodiment of the present invention.

FIG. 8 is a configuration drawing indicating a third embodiment of the present invention. In FIG. 8, the same objects as those in FIG. 5 are given the same signs and so description of them and indication in the drawing are both omitted. In FIG. 8, spectroscope 60 is provided instead of spectroscope 30. Spectroscope 60 also has optical fiber 11, fiber grating 61 as the wavelength dispersion device, lens 62, PDM 16 and piezoelectric actuator 63 as a driving means. Fiber grating 61 includes a grating area formed by changing the periodical refractive index in the longitudinal direction of the optical fiber core.

Fiber grating 61 is connected with the emission end of optical fiber 11 by, for example, fusion welding and measured light beam 100 is incident. Fiber grating 61 spectrally divides the incident light to measured light beams 100A and 100B for each of wavelengths λA and λB at grating area 61a in which the grating is formed and emits them at different angles to the space from fiber grating 61 itself for every wavelength of λA and λB. Lens 62 is installed in the optical path of emitted light from fiber grating 61 and focuses the emitted light. PDM 16 is mounted so that its position is where measured light beams 100A and 100B are focused by lens 62, and outputs photocurrents generated in each PD. Piezoelectric actuator 63 is mounted by aligning its direction of expansion or contraction with the longitudinal direction of grating area 61a. In addition, a voltage is applied to piezoelectric actuator 63 from driver 42.

Operations of the spectrometer shown in FIG. 8 will now be described. Driver 42 applies voltage Ve to piezoelectric actuator 63 based on the first time synchronizing signal and expands or contracts piezoelectric actuator 63 by the desired amount. This also expands or contracts grating area 61a to which piezoelectric actuator 63 is attached in the longitudinal direction. For this reason, the period of the refractive index, which is provided for grating area 61a to vary periodically, changes and so measured light beams 100A and 100B emitted from grating area 61a are deflected in the arranging direction of the PD array on PDM 16. Here, it is assumed that the center of the optical spot of measured light beams 100A and 100B irradiates the same position as that on the PD array of the spectrometer shown in FIG. 5. Further, driver 42 applies voltage Vf to piezoelectric actuator 63 based on the second time synchronizing signal, expands or contracts piezoelectric actuator 63 by the desired amount, and deflects measured light beams 100A and 100B in the arranging direction of the PD array in a similar manner. However, measured light beams 100A and 100B are deflected so that their irradiating position on the PD array is shifted by a ½ pitch towards the longer wavelength from the position at which measured light beams 100A and 100B irradiate on the PD array based on the first time synchronizing signal.

Here, since operations other than applying voltages Ve and Vf by driver 42 to piezoelectric actuator 63 based on the synchronizing signals and deflecting measured light beams 100A and 100B emitted from grating area 61a, are the same as those in the spectrometer shown in FIG. 5, so description of them is omitted.

As described above, measured light beams 100A and 100B are measured by deflecting measured light beams 100A and 100B in the arranging direction of the PD array on PDM 16 using piezoelectric actuator 63, performing a series of operations, in which driving means 43 acquires measuring signals two or more times, and sorting these signals in order of wavelength. This enables measured signals to be acquired similar to the measurement with smaller pitch than one pitch, and thus measurement can be performed even if the optical spot size of measured light beams 100A and 100B is made smaller because the data whose detecting outputs are small and which are easily subjected to influences of noise are not used. Consequently, the optical signal level and the peak wavelength can be measured with improved wavelength resolution.

Figure 9:
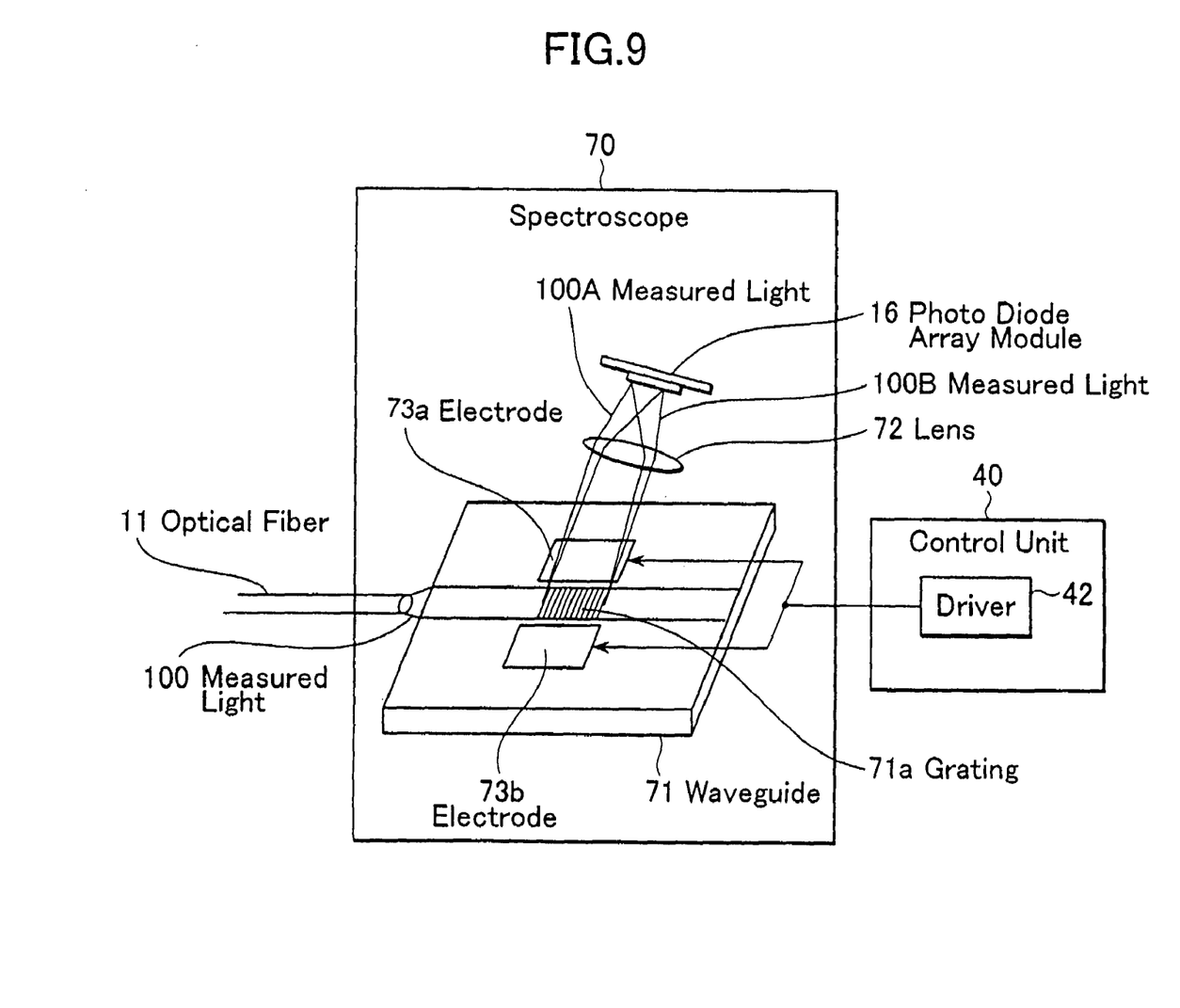
FIG. 9 is a configuration drawing indicating a fourth embodiment of the present invention.

FIG. 9 is a configuration drawing indicating a fourth embodiment of the present invention. In FIG. 9, the same objects as those in FIG. 5 are given the same signs and so description of them and indication in the drawing are both omitted. In FIG. 9, spectroscope 70 is provided instead of spectroscope 30. Spectroscope 70 also includes optical fiber 11, waveguide grating 71 as the wavelength dispersion device, lens 72, PDM 16 and electrodes 73a and 73b as a deflecting means. Waveguide grating 71 includes a grating area where the periodical refractive index change is mechanically formed in the longitudinal direction of the optical waveguide. The optical waveguide is composed of a medium having the electro-optical effect, such as lithium niobate or the like.

Optical fiber 11 is a transmission line that makes measured light beam 100 be incident to spectroscope 70. Measured light beam 100 emitted from the emission end of optical fiber 11 is incident to waveguide grating 71. In this case, a lens or matching oil or the like may be provided between optical fiber 11 and waveguide grating 71 to enable measured light beam 100 to be incident to waveguide grating 71 efficiently.

Waveguide grating 71 spectrally divides the incident light to measured light beams 100A and 100B for each of wavelengths λA and λB at grating area 71a in which the grating is formed, and emits them at different angles to the space from waveguide grating 71 itself for every wavelength of λA and λB. Lens 72 is installed in the optical path of the light emitted from waveguide grating 71 and focuses the emitted light. PDM 16 is mounted so that its position is where measured light beams 100A and 100B are focused by lens 72, and outputs photocurrents generated in each PD. Electrodes 73a and 73b are mounted counter to each other on both sides of grating area 71a. The shape of electrodes 73a and 73b should be that of a comb. Voltages are applied to electrodes 73a and 73b from driver 42 respectively.

Operations of the spectrometer shown in FIG. 9 will now be described. Driver 42 applies voltage Vg to electrodes 73a and 73b based on the first time synchronizing signal, changes the refractive index of grating area 71a using the electro-optic effect, and deflects measured light beams 100A and 100B emitted from grating area 71a in the arranging direction of the PD array of PDM 16 by the desired amount. Here, it is assumed that the center of the optical spot of measured light beams 100A and 100B irradiates the same position as that on the PD array of the spectrometer shown in FIG. 5. Further, driver 42 applies voltage Vh to electrodes 73a and 73b based on the second time synchronizing signal, changes the refractive index of grating area 71a using the electro-optic effect, and deflects measured light beams 100A and 100B emitted from grating area 71a in the arranging direction of the PD array by the desired amount. However, measured light beams 100A and 100B are deflected so that their irradiating position on the PD array is shifted by a ½ pitch towards the longer wavelength from the position at which measured light beams 100A and 100B irradiate on the PD array based on the first time synchronizing signal.

Here, since operations other than applying voltages Vg and Vh by driver 42 to electrodes 73a and 73b based on the synchronizing signals and deflecting measured light beams 100A and 100B emitted from grating area 71a are the same as those in the spectrometer shown in FIG. 5, description of them is omitted.

As described above, measured light beams 100A and 100B are measured by deflecting measured light beams 100A and 100B in the arranging direction of the PD array on PDM 16 using voltages Vg and Vh applied to electrodes 73a and 73b, performing a series of operations, in which driving means 43 acquires measuring signals two or more times, and sorting these signals in order of wavelength values. This enables measured signals to be acquired similar to the measurement with a pitch smaller than one pitch, and thus measurement can be performed even if the optical spot size of measured light beams 100A and 100B is made smaller because the data whose detecting outputs are small and which are easily subjected to influences of noise are not used. Consequently, the optical signal level and the peak wavelength can be measured with improved wavelength resolution.

Further, the electro-optic effect brought by applying a voltage to electrodes of waveguide grating 71 is adopted for deflection of measured light beams 100A and 100B. Since the above deflecting means has no moving parts, spectroscope 70 can be operated stably for a long time.

Note that the present invention is not restricted to the configurations mentioned above; the configurations shown below may also be employed.

Although an example is shown in which measured light beam 100 is multiplexed in two channels of wavelengths λA and λB, any number of channels may be multiplexed.

In FIG. 5, although electro-optic beam deflector 31 is provided between mirror 15 and PDM 16, the deflector may be installed anywhere if the installing place exists before measured light beam 100 is incident to PDM 16, such as between optical fiber 11 and lens 12 or between lens 12 and grating 13.

Also in FIG. 5, although the configuration in which the light beam emitted from lens 14 is reflected by mirror 15 and detected by PDM 16, a configuration in which mirror 15 is not provided and PDM 16 is installed in a position where the light beam emitted from lens 14 is focused may be employed. Electro-optic beam deflector 31 can be provided anywhere if the installing place exists before measured light beam 100 is incident to PDM 16.

The configuration in which grating 13 is used as the wavelength dispersion device in the spectrometers shown in FIG. 5 and FIG. 7 is indicated. However, that configuration may use a prism as the wavelength dispersion device or may use both a prism and grating 13. The wavelength dispersion angles of a prism and grating 13 can be matched by using both a prism and grating 13.

In the spectrometers shown in FIG. 5 and FIG. 7, a plane type grating is used for grating 13. However, a concave type grating can also be used. In addition, a configuration without using lens 12 and/or lens 14 may be adopted by using a concave type grating. This enables PDM 16 to detect measured light beam 100 without attenuation through lens 12 and/or lens 14.

In the spectrometers shown in FIG. 5 and FIG. 7 to FIG. 9, although a transmission type optical system using lens 12 and/or 14, or 62 or 72 is shown, a reflection type optical system using a parabolic mirror can also be used.

In the spectrometers shown in FIG. 5 and FIG. 7 to FIG. 9, a configuration, in which deflection of measured light beams 100A and 100B is carried out with the deflection amount of a ½ pitch towards longer wavelengths, is indicated. However, any deflection amount may be used if it is within one pitch and the beams can also be deflected towards shorter wavelengths.

In addition, spectroscopes shown in FIG. 5 and FIG. 7 to FIG. 9 are presented as examples of the spectroscope. However, the present invention can be adapted to all spectroscopes that use a PD array system.

Although, in the spectrometers shown in FIG. 5 and FIG. 7 to FIG. 9, a configuration in which driver 42 applies a voltage to a deflecting means based on the synchronizing signal of synchronizing means 41 and driving means 43 reads the measured signal from PDM 16, a configuration without providing synchronizing means 41 may also be used. In the configuration without providing synchronizing means 41, it is arranged such that signals are exchanged between driver 42 and driving means 43. For example, driver 42 applies a voltage to a deflecting means, deflects measured light beams 100A and 100B by a desired amount, and then outputs a signal to driving means 43. Driving means 43 starts to read the measured signal from PDM 16 based on the signal output from driver 42.

In the spectrometer shown in FIG. 7, an example, in which piezoelectric actuator 52 is mounted so that it mechanically shifts mirror 51 and in which a deflecting means is composed of mirror 51 and piezoelectric actuator 52, is shown. However, a configuration, in which piezoelectric actuator 52 is attached to PDM 16 as a moving means and the actuator moves PDM 16 in the arranging direction of PD array by a desired amount, may be adopted. In such a configuration, the moving means moves PDM 16 to change the position where PDM 16 detects measured light beams 100A and 100B.

In the spectrometer shown in FIG. 8, a configuration in which piezoelectric actuator 63 is used as a deflecting means is shown, and in the spectrometer shown in FIG. 9, a configuration in which electrodes 73a and 73b are used as a deflecting means is shown. However, measured light beams 100A and 100B may be deflected by a deflecting means which is composed of mirror 51 and piezoelectric actuator 52 and placed in the optical path between grating area 61a or 71a that emits the light beams and PDM 16 to which these light beams are incident.

Further, although in the spectrometer shown in FIG. 8, a configuration in which piezoelectric actuator 63 is used as a deflecting means is shown, and in the spectrometer shown in FIG. 9, a configuration in which electrodes 73a and 73b are used as a deflecting means is shown, measured light beams 100A and 100B may be deflected by electro-optic beam deflector 31 placed in the optical path between grating area 61a or 71a that emits the light beams and PDM 16 to which these light beams are incident. Particularly in FIG. 8, this enables spectroscope 60 to operate stably for a long time because mechanical moving parts are removed.

According to the present invention, there are the following effects:

Since a deflecting means deflects measured light beams and changes the position where they are detected with a photodiode array, measured signals equivalent to those obtained by measurement using smaller pitch can be obtained without actually making the photodiode pitch smaller. This enables the optical spot size of measured light beams to be made smaller without using the data whose detecting outputs are small and which are easily subjected to influences of noise, and measurement can be performed with improved wavelength resolution without being affected by the photodiode pitch.

Since the deflecting means employs an electro-optic effect, the spectroscope can be configured without including mechanical moving parts. This enables the spectrometer to be operated stably for a long time.

Since a moving means moves the photodiode array in the direction in which obtaining the measured light beam spectrum is progressed and changes the position where the beam is detected with the photodiode array, measured signals equivalent to those obtained by measurement using smaller pitch can be obtained without actually making the photodiode pitch smaller. This enables the optical spot size of measured light beams to be made smaller without using the data whose detecting outputs are small and which are easily subjected to influences of noise, and measurement can be performed with improved wavelength resolution without being affected by the photodiode pitch.

What is claimed is:

1. A spectrometer comprising:
   a wavelength dispersion device spectrally dividing the measured light beam;
   a photodiode array composed of a plurality of photodiodes that detect the spectrally divided light beams by the wavelength dispersion device and output photocurrents for performing measurement; and
   a deflecting means that deflects said measured light beam and changes the position where said measured light beam is detected by said photodiode array,
   wherein the characteristics of said measured light beam are determined from the measured results for different deflection amounts, and
   wherein said wavelength dispersion device is a grating provided in the longitudinal direction of an optical fiber core.

2. A spectrometer in accordance with claim 1, wherein said deflecting means is a piezoelectric actuator which is mounted along the longitudinal direction of the optical fiber on which a grating is provided and expands or contracts the optical fiber.

3. A spectrometer comprising:
   a wavelength dispersion device spectrally dividing the measured light beam;
   a photodiode array composed of a plurality of photodiodes that detect the spectrally divided light beams by the wavelength dispersion device and output photocurrents for performing measurement; and
   a deflecting means that deflects said measured light beam and changes the position where said measured light beam is detected by said photodiode array,
   wherein the characteristics of said measured light beam are determined from the measured results for different deflection amounts, and
   wherein said wavelength dispersion device is a grating provided on an optical waveguide.

4. A spectrometer in accordance with claim 3, wherein said deflecting means is a pair of electrodes which are installed on both sides of the optical waveguide on which a grating is provided counter to each other and deflects the measured light beam using the electro-optic effect.

5. A spectrometer in accordance with any one of claims 1,2,3, and 4, wherein said deflecting means causes deflection within one pitch that is the sum of the width of a photodiode and the width of a dead zone between adjacent photodiodes on said photodiode array.

* * * * *